United States Patent
McRae

(10) Patent No.: US 7,551,577 B2
(45) Date of Patent: Jun. 23, 2009

(54) ACCESS POINT PROVISIONING AND MAPPING IN DUAL MODE DEVICES

(75) Inventor: Matthew B. McRae, Laguna Beach, CA (US)

(73) Assignee: Cisco Technology, Inc, San Jose, CA (US)

( * ) Notice: Subject to any disclaimer, the term of this patent is extended or adjusted under 35 U.S.C. 154(b) by 706 days.

(21) Appl. No.: 11/096,885

(22) Filed: Apr. 1, 2005

(65) Prior Publication Data

US 2006/0221917 A1    Oct. 5, 2006

(51) Int. Cl.
*H04W 4/00* (2006.01)

(52) U.S. Cl. .................. 370/328; 370/469; 455/434

(58) Field of Classification Search .......... 370/328, 370/329, 338

See application file for complete search history.

(56) References Cited

U.S. PATENT DOCUMENTS

| 7,187,923 | B2* | 3/2007 | Mousseau et al. | 455/416 |
| 7,286,515 | B2* | 10/2007 | Olson et al. | 370/338 |
| 2004/0156372 | A1* | 8/2004 | Hussa | 370/401 |
| 2004/0174900 | A1* | 9/2004 | Volpi et al. | 370/466 |
| 2008/0132228 | A1* | 6/2008 | Mousseau et al. | 455/426.1 |

* cited by examiner

*Primary Examiner*—Phirin Sam
(74) *Attorney, Agent, or Firm*—Haynes and Boone, LLP.

(57) ABSTRACT

A system and method are provided for provisioning and updating wireless local area network (LAN) access point and/or hotspot information on a wireless dual mode device by leveraging an out of band network. A system and method to map wireless LAN access points or hotspots are also provided.

19 Claims, 2 Drawing Sheets

ACCESS POINT PROVISIONING AND MAPPING IN DUAL MODE DEVICES

TECHNICAL FIELD

The present invention relates generally to wireless devices and, more particularly, to a system and method for provisioning and updating access point and/or hotspot information on a wireless device.

BACKGROUND

Dual mode devices, such as dual mode handsets, PDAs, laptops, and other mobile wireless devices, have a cellular radio transceiver for access to a carrier's radio access network (RAN) and a wireless fidelity (WiFi) radio transceiver for access to a wireless local area network (LAN). Many service providers and wireless carriers are planning to deploy these dual mode devices to customers so they can utilize WiFi networks when available and fill in gaps between WiFi networks using the cellular network.

There are many reasons why the WiFi network may be preferable to the user and the carrier. The WiFi network may be free to the carrier and would reduce the cost associated with setting up a call for a dual mode device because the access point (AP) operator and service provider (SP) providing bandwidth may be different parties. The dual mode device may also gain access to additional features when in a WiFi LAN.

There are many WiFi network operators and personally owned APs available. Some operators are beginning to sign roaming agreements in a way that replicates the norm in the cellular industry. However, there is no current solution to update dual mode devices automatically with information related to APs or associated hotspots, such as preferred WiFi hotspots, security settings, known free hotspots, known hotspots where the carrier has a roaming agreement, and so on.

Instead, the end user is required to manually configure all of this information into the dual mode device. Disadvantageously, this information may change on a regular basis as new hotspots are created, existing hotspots are turned off, and roaming agreements are created/concluded. Thus, a system and method to continuously and/or automatically update and map hotspot/AP information in a dual mode device is highly desirable.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

The present invention provides a system and method to update access point (AP) or hotspot information in a dual mode device by leveraging an out of band network, such as the cellular network, for secure communication. In one embodiment, a system and method to map APs or hotspots are also provided by "finding" hotspots using location information and global positioning satellite (GPS) software.

Advantageously, the present invention allows for improved service for mobile wireless devices, when for example, a cellular carrier sells dual mode devices to its customers and desires to provide the best quality of service to the user and the widest access to hotspots. The carrier may provision AP/hotspot information into the device to set, for example, the following potential conditions: 1) list of known hotspot locations; 2) prioritized list of preferred hotspots (e.g., Sprint PCS before T-Mobile, etc.); SSID, security, and other information for each network; and 4) other information important for the device to select the correct hotspots.

A dual mode device (DMD) as used in this document refers to handsets, PDAs, laptops, and other mobile wireless devices, that have a transceiver for access to a carrier's out of band network (e.g., a cellular radio transceiver for access to a carrier's radio access network (RAN)) and a wireless local area network (LAN) radio transceiver (e.g., wireless fidelity (WiFi), Bluetooth, ultra wideband (UWB) radio, etc.) for access to a network (e.g., a wireless LAN or the Internet).

An AP may be any device that allows wireless-equipped computers and other devices to communicate with a wired network. An AP may also be used to expand the range of a wireless network. In one example, an AP is able to support WiFi in general, and the 802.11a, 802.11b, and/or 802.11g wireless networking standards in particular. Examples of applicable APs for the present invention include but are not limited to the Wireless-B Access Point (Model WAP11), Wireless-G Access Point (Model WAP54G), and Dual-Band Wireless A+G Access Point (Model WAP55AG), available from Linksys, a division of Cisco Systems, Inc., of San Jose, Calif.

A hotspot may be a location with a high-speed Internet connection and wireless connectivity provided by one or more active wireless APs. A hotspot may be public or private.

The term "out of band" (OOB) as used in this document refers to a network other than supported by wireless LAN technology, such as the 802.11 network (i.e., networks utilizing the 802.11a, 802.11b, and/or 802.11g wireless networking standards or WiFi), to receive or send information to the device. The type of OOB network used may be RAN, CDMA, GSM, TDMA, WiMax, 3G, 4G, or any network other than wireless LAN technology such as WiFi or Bluetooth.

Figure 1:
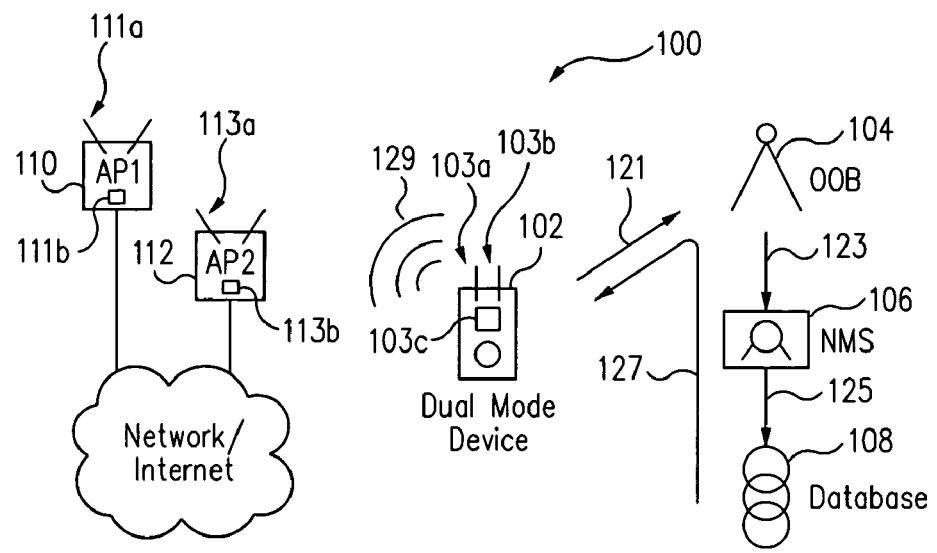
FIG. 1 shows a system for access point provisioning in accordance with an embodiment of the present invention.

Referring now to FIG. 1, a hotspot/AP provisioning system 100 is illustrated in accordance with an embodiment of the present invention. System 100 includes a DMD 102 (e.g., dual mode handsets, PDAs, laptops, or other mobile wireless device), an OOB network 104 (e.g., RAN, CDMA, GSM, TDMA, WiMax, 3G, 4G, or an applicable network other than WiFi), a network management system (NMS) 106, a database 108, and access points (APs) 110 and 112, in accordance with an embodiment of the present invention.

In accordance with an embodiment of the present invention, DMD 102 includes a first transceiver/antenna 103a and a second transceiver/antenna 103b, one of which may be used to communicate with the OOB network while the other may be used to communicate with an access point. DMD 102 further includes a processor 103c operably coupled to transceivers 103a and 103b for processing data, in particular information about access points.

In accordance with an embodiment of the present invention, APs 110 and 112 include a transceiver 111a and 113a, respectively, and a processor 111b and 113b, respectively. The processor is configured to allow a wireless device (e.g., a DMD) access to a network connected to the access point (e.g., via a 10/100 Ethernet RJ-45 port) after receiving access information from the wireless device.

Figure 2:
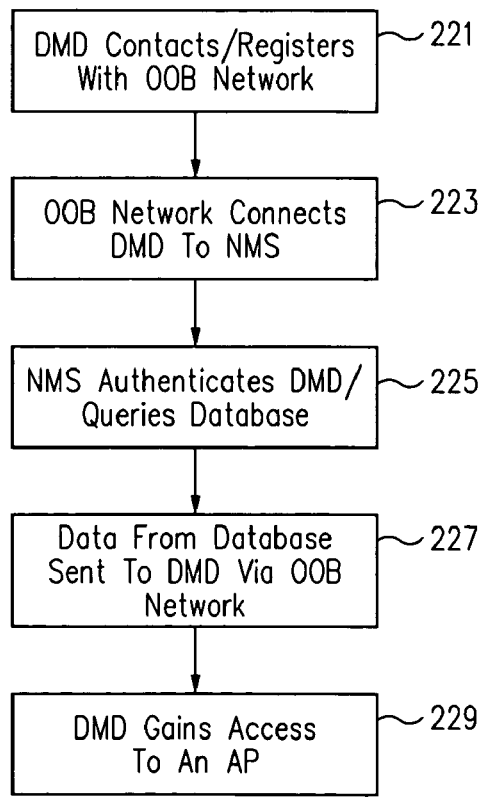
FIG. 2 shows a flowchart of a method for access point provisioning in accordance with an embodiment of the present invention.

Referring now to FIG. 2 in conjunction with FIG. 1, a flowchart of a method of provisioning hotspot/AP information using system 100 is illustrated in accordance with an embodiment of the present invention.

At step 221, DMD 102 contacts and registers with OOB network 104 (arrow 121 of FIG. 1), in one example, at power up of the device, at first provisioning, at a specific time interval, or at a triggered event (e.g., user pressed key, WiFi network sensed, DMD changed location, new software load, etc.). The triggered event could come from the OOB network system and push the updated configuration to the DMD. DMD 102 may also make an inquiry for an updated configuration for the WiFi portion of the device, in one example including but not limited to the following information:
1. Preferred hotspot SSIDs
2. Prioritized hotspot list
3. Location of hotspots
4. Method of authentication
5. Login information
6. Security information Examples of the above information that may be captured and sent include but are not limited to the following:
1. SSID=Linksys, SSID=home, SSID=tmobile, etc.
2. P1=Linksys, P2=tmobile, P3=att, etc.
3. AP1=lat:120.12, lon=97.36
4. Method=httppost, httpget, 802.1x, leap, peap, WPA, WEP, etc.
5. Username=test, password=middlename
6. WEPkey=1733FE8AC782ABD5, WPApass=passphrase, etc.

At step 223, OOB network 104 connects DMD 102 to the carrier's NMS 106 (arrow 123 of FIG. 1), which authenticates DMD 102 and then queries the carrier's database 108 for AP/hotspot information, as shown at step 225 (arrow 125 of FIG. 1).

At step 227, the AP/hotspot information from database 108 is sent to DMD 102 via OOB network 104 for configuration and/or provisioning (arrow 127 of FIG. 1). The data sent to DMD 102 may be a completed database of hotspots or a localized version with only those hotspots in a certain area around the current location of DMD 102. The location of DMD 102 may be determined by GPS, by the carrier's antenna system, or other similar systems. The data sent to DMD 102 may also be filtered by the end user based on preferences or frequented locations.

At step 229, DMD 102 then uses the AP/hotspot information to access a wireless network (e.g., WiFi or Bluetooth) and select an AP (waves 129 of FIG. 1), based upon selection criteria designed by the user's carrier. The user may also be able to manually add APs to the list (e.g., the user's personal AP).

If the data that is downloaded to the DMD does not contain an AP/hotspot located in the range of the DMD, the DMD itself could then direct the user to the nearest AP/hotspot. The user may thus navigate to nearby AP/hotspot locations via the DMD, which may have GPS functionality (either directly or via assisted GPS from OOB) and the coordinates of nearby AP/hotspots from the downloaded configuration. In one embodiment, a user interface (e.g., a screen) of the DMD may act as a navigation system to direct the user to the nearest LAN (e.g., WiFi, Bluetooth).

Figure 3:
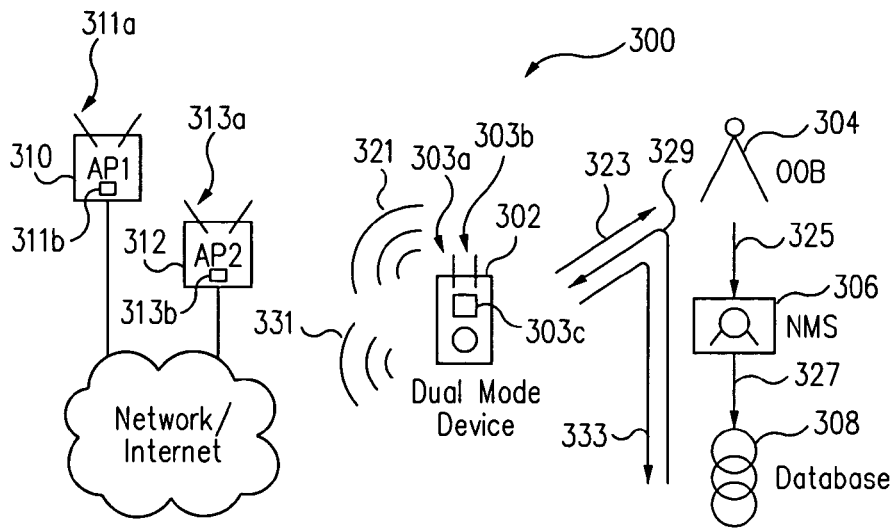
FIG. 3 shows a system for access point/hotspot mapping in accordance with another embodiment of the present invention.

FIG. 3 illustrates an AP/hotspot provisioning system 300 in accordance with another embodiment of the present invention. Similar to system 100 described above with respect to FIG. 1, system 300 includes a dual mode device (DMD) 302 (e.g., handsets, PDAs, laptops, or other mobile wireless device), an OOB network 304 (e.g., RAN, CDMA, GSM, TDMA, WiMax, 3G, 4G, or a network other than WiFi), a network management system (NMS) 306, and a database 308.

In accordance with an embodiment of the present invention, DMD 302 includes a first transceiver/antenna 303a and a second transceiver/antenna 303b, one of which may be used to communicate with the OOB network while the other may be used to communicate with an access point. DMD 302 further includes a processor 303c operably coupled to transceivers 303a and 303b for processing data, in particular information about access points.

Access points (APs) 310 and 312 are also included in system 300. In accordance with an embodiment of the present invention, APs 310 and 312 include a transceiver 311a and 313a, respectively, and a processor 311b and 313b, respectively. The processor is configured to allow a wireless device (e.g., a DMD) access to a network connected to the access point (e.g., via a 10/100 Ethernet RJ-45 port) after receiving access information from the wireless device.

Figure 4:
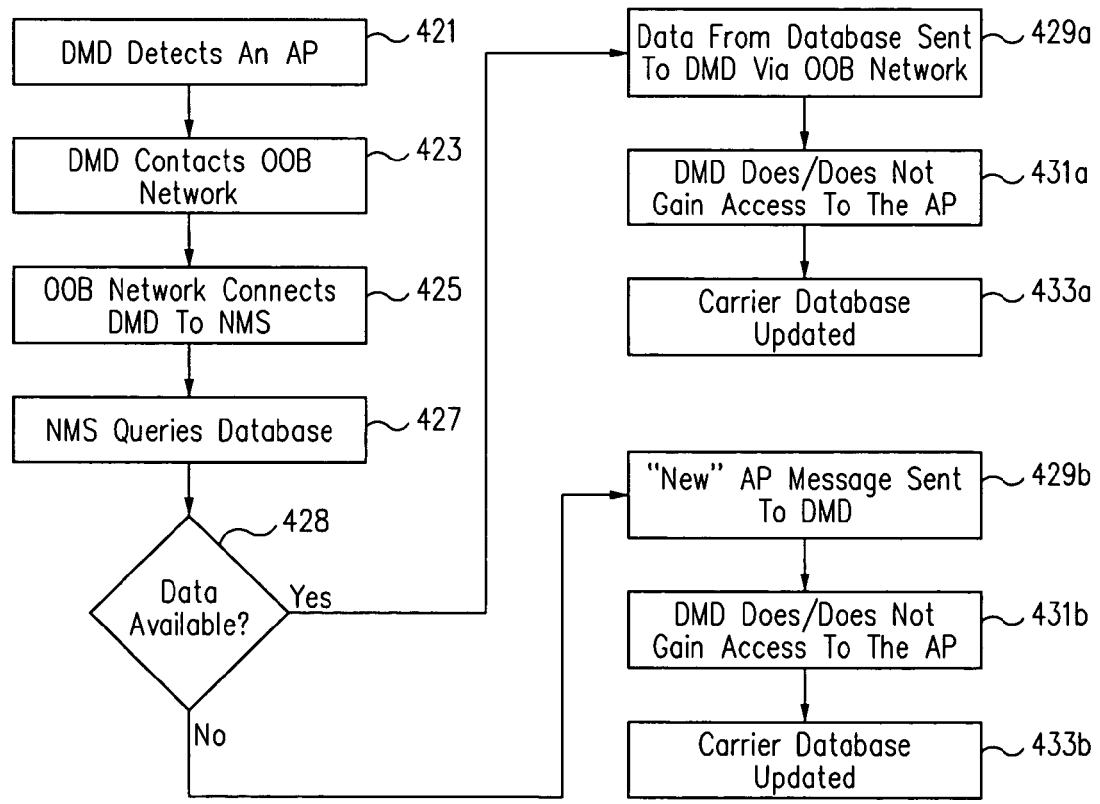
FIG. 4 shows a flowchart of a method for access point/hotspot mapping in accordance with an embodiment of the present invention.

Referring now to FIG. 4 in conjunction with FIG. 3, a flowchart of a method of provisioning AP/hotspot information using system 300 is illustrated in accordance with an embodiment of the present invention.

In accordance with this embodiment, DMD 302 may query OOB network 304 for information on an AP or a plurality of APs of interest (e.g., AP 310 and/or 312) on a WiFi network detected by DMD 302. At step 421, DMD 302 detects an AP (e.g., AP 310 or 312) in an area with an unknown SSID or login requirements (wave 321 of FIG. 3).

At step 423, DMD 302 contacts OOB network 304 (arrow 323 of FIG. 3). At step 425, network 304 connects DMD 302 to the carrier's NMS 306 (arrow 325 of FIG. 3), which authenticates DMD 302 and then queries the carrier's database 308 for information on the detected AP(s), for example to check if the carrier has the AP of interest listed as a preferred hotspot and/or what the login credentials may be, as shown at step 427 (arrow 327 of FIG. 3).

At step 428, a determination is made whether data regarding the detected AP is available. If data is available, database 308 responds with information on the AP including credentials, etc., as shown by step 429a (arrow 329 of FIG. 3). DMD 302 may then use the database information to attempt to associate and gain access to the detected AP of interest, as shown at step 431a (waves 331 of FIG. 3). If either access is or is not granted, carrier database 308 is updated, as shown at step 433a (arrow 333 of FIG. 3).

If data is not available, database 308 responds that the AP of interest is a new AP, as shown by step 429b (arrow 329 of FIG. 3). DMD 302 may then attempt to associate and gain access to the detected AP of interest without AP information, as shown at step 431b (waves 331 of FIG. 3). If either access is or is not granted, carrier database 308 may be updated, as shown at step 433b (arrow 333 of FIG. 3). Location information for the new AP may be provided with GPS software. In other words, if the hotspot is not listed in the carrier's database, but the DMD is able to associate with and gain access to the network (e.g., a wide area network (WAN)), DMD 302 may optionally send, via the OOB network or WiFi network, the AP/hotspot's information (e.g., geographic location, SSID, login, etc.) to the carrier's database.

Advantageously, this hotspot is then added to the carrier's list of known APs and the carrier's database may be constantly and automatically updated with the latest known APs. In other words, the carrier's hotspot map will be dynamically updated by the devices on the network. The carrier's cellular dual mode user base of thousands or millions of users may constantly and accurately (automatically) update the network database for known hotspots in a given territory. The present invention thus removes a large amount of needed resources to keep a list up to date. As hotspots go up or down, the DMDs will be capable of reporting back to the carrier and the AP/hotspot map will be up-to-date and accurate. As users find hotspots, hotspot operators may also work with the carriers to provide improved coverage.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A dual mode apparatus, comprising:
    a first transceiver for communicating with an out of band (OOB) network;
    a second transceiver for communicating with an access point supporting a wireless local area network (LAN); and
    a processor for processing provisioning information about the access point received from the OOB network,
    wherein the first transceiver is configured to automatically transmit at a time interval a signal querying the OOB network for provisioning information about the access point selected from the group consisting of preferred hotspot SSIDs, a prioritized hotspot list, location of access points, location of hotspots, method of authentication, login information, and security information.

2. The apparatus of claim 1, wherein the OOB network is selected from the group consisting of a radio access network (RAN), CDMA, GSM, TDMA, WiMax, 3G, and 4G.

3. The apparatus of claim 1, wherein the first transceiver is capable of transmitting data to the OOB network to update a database with information about the access point, the LAN supported by the access point, or a hotspot associated with the access point.

4. The apparatus of claim 1, wherein the access point supports the 802.11a, 802.11b, and/or 802.11g wireless networking standards.

5. The apparatus of claim 1, wherein the access point supports one of WiFi, Bluetooth, and ultra wideband (UWB).

6. The apparatus of claim 1, wherein the wireless LAN allows for connectivity to the Internet.

7. The apparatus of claim 1, wherein the second transceiver is capable of transmitting information to the access point to gain access to the LAN.

8. An access point, comprising:
    a transceiver for communicating with a dual mode apparatus, the dual mode apparatus including:
        a first transceiver for communicating with an out of band (OOB) network;
        a second transceiver for communicating with an access point supporting a wireless local area network (WLAN); and
        a processor for processing provisioning information about the access point received from the OOB network, wherein the first transceiver is configured to automatically transmit at a time interval a signal querying the OOB network for provisioning information about the access point selected from the group consisting of preferred hotspot SSIDs, a prioritized hotspot list, location of access points, location of hotspots, method of authentication, login information, and security information;
    means for communicating with a local area network (LAN); and
    a processor configured to allow the dual mode apparatus access to the LAN after receiving access information from the dual mode apparatus, the access information originating from the OOB network.

9. The access point of claim 8, wherein the access point supports the 802.11a, 802.11b, and/or 802.11g wireless networking standards.

10. The access point of claim 8, wherein the access point supports one of WiFi, Bluetooth, and ultra wideband (UWB).

11. The access point of claim 8, wherein the out of band network is selected from the group consisting of a radio access network (RAN), CDMA, GSM, TDMA, WiMax, 3G, and 4G.

12. The access point of claim 8, wherein the dual mode apparatus is selected from the group consisting of a handset, a PDA, a laptop, and a wireless device.

13. A method of provisioning a dual mode device with access point information, the method comprising:
    contacting an out of band (OOB) network including a network management system and a database;
    automatically querying the OOB network at a time interval for wireless local area network (LAN) access point information in the database, wherein the access point information is selected from the group consisting of preferred hotspot SSIDs, a prioritized hotspot list, location of access points, location of hotspots, method of authentication, login information, and security information; and
    receiving the access point information at the dual mode device from the OOB network to provision the dual mode device.

14. The method of claim 13, wherein the contacting of the OOB network occurs at power up of the dual mode device, at first provisioning, or at a triggered event.

15. The method of claim 13, further comprising using the access point information to access a network coupled to an access point.

16. A method of provisioning a dual mode device with access point information, the method comprising:
    providing an out of band (OOB) network including a network management system and a database;
    receiving an automatic query at a time interval for wireless local area network (LAN) access point information in the database from a dual mode device, wherein the access point information is selected from the group consisting of preferred hotspot SSIDs, a prioritized hotspot list, location of access points, location of hotspots, method of authentication, login information, and security information; and
    transmitting the access point information retrieved from the database to the dual mode device to provision the dual mode device.

17. The method of claim 16, further comprising authenticating the dual mode device.

18. A method of mapping an access point or a hotspot, the method comprising:
    detecting an access point coupled to a local area network (LAN);

contacting an out of band (OOB) network including a network management system and a database;

automatically querying at a time interval the OOB network for provisioning information about the access point in the database, wherein the information about the access point is selected from the group consisting of preferred hotspot SSIDs, a prioritized hotspot list, location of access points, location of hotspots, method of authentication, login information, and security information;

receiving information about the access point from the OOB network;

attempting access to the network coupled to the access point; and transmitting data to the OOB network to update the database with information about the access point.

19. The method of claim 18, further comprising transmitting data to the OOB network to update the database with information about the network coupled to the access point and/or a hotspot associated with the access point.

* * * * *